United States Patent
Ukisu et al.

(10) Patent No.: US 10,843,878 B2
(45) Date of Patent: Nov. 24, 2020

(54) ARTICLE TRANSPORT FACILITY

(71) Applicant: Daifuku Co., Ltd., Osaka (JP)

(72) Inventors: Kenichi Ukisu, Tokyo (JP); Atsushi Kurayama, Tokyo (JP); Sadataka Nishihara, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 88 days.

(21) Appl. No.: 16/211,358

(22) Filed: Dec. 6, 2018

(65) Prior Publication Data
US 2019/0177094 A1     Jun. 13, 2019

(30) Foreign Application Priority Data

Dec. 11, 2017 (JP) .................... 2017-237136

(51) Int. Cl.
*B65G 47/90* (2006.01)
*B65G 37/00* (2006.01)

(52) U.S. Cl.
CPC .......... *B65G 47/905* (2013.01); *B65G 37/00* (2013.01); *B65G 2203/0216* (2013.01); *B65G 2203/041* (2013.01)

(58) Field of Classification Search
CPC .......... B65G 47/90; B65B 5/08; B65B 25/20; B65B 5/105; B65B 1/24
USPC ....................................................... 221/211
See application file for complete search history.

(56) References Cited

U.S. PATENT DOCUMENTS

| | | | | |
|---|---|---|---|---|
| 5,326,218 A | * | 7/1994 | Fallas | B25J 9/106 414/733 |
| 5,857,311 A | * | 1/1999 | Focke | B65B 5/06 53/434 |
| 6,438,928 B1 | * | 8/2002 | Huang | B65B 5/108 53/249 |
| 6,959,525 B2 | * | 11/2005 | Prakken | B65B 5/061 53/249 |
| 8,875,942 B2 | * | 11/2014 | Poliner | G07F 11/14 221/210 |
| 10,549,928 B1 | * | 2/2020 | Chavez | B25J 9/1697 |
| 2007/0245692 A1 | * | 10/2007 | Abbott | B65B 53/02 53/442 |

FOREIGN PATENT DOCUMENTS

JP          201539767 A        3/2015

* cited by examiner

*Primary Examiner* — Timothy R Waggoner
(74) *Attorney, Agent, or Firm* — The Webb Law Firm

(57) ABSTRACT

The transfer apparatus transfers an article, which is a package, to a container while holding an upper face of the package. A control apparatus performs both a transfer control to cause the transfer apparatus to transfer the article to the container and a first pressing control to cause the pressing apparatus to press, from above, the article that has been transferred to the container through the transfer control if the article to be transferred by the transfer apparatus is a type 1 article, and performs only the transfer control, of the transfer control and the first pressing control, if the article to be transferred by the transfer apparatus is a type 2 article.

5 Claims, 6 Drawing Sheets

ARTICLE TRANSPORT FACILITY

CROSS-REFERENCE TO RELATED APPLICATION

This application claims priority to Japanese Patent Application No. 2017-237136 filed Dec. 11, 2017, the disclosure of which is hereby incorporated in its entirety by reference.

BACKGROUND OF THE INVENTION

Field of the Invention

The present invention relates to an article transport facility that includes a transfer apparatus for transferring, to a container, an article that is a package containing a contained item.

Description of the Related Art

A conventional example of such an article transport facility is described in JP 2015-039767A. The article transport facility described in JP 2015-039767A transfers an article to a container using a transfer apparatus (picking robot P). There are cases where this kind of article transport facility transfers an article, which is formed by a package, such as one made of synthetic resin, containing a contained item, while holding an upper face of the package using the transfer apparatus.

SUMMARY OF THE INVENTION

If the package and the contained item are soft, there are cases where, when the upper face of the package is held by the transfer apparatus, the package deforms to drop down, making the pressure within the package negative, and air flows into the package from a ventilation hole formed in the package. As a result of air thus flowing into the package, the article to be transferred to the container expands and the volume thereof increases, which degrades the storage efficiency of the container. For this reason, there is a need to increase the storage efficiency of the container in the case of transferring, to the container, an article that is a package containing a contained item.

There is, accordingly, a demand for realizing an article transport facility capable of increasing the storage efficiency of a container in the case of transferring, to the container, an article that is a package containing a contained item.

In view of the foregoing situation, a characteristic configuration of an article transport facility is an article transport facility that includes a transfer apparatus for transferring, to a container, an article that is a package containing a contained item, the article transport facility including: a pressing apparatus configured to press, from above, the article that has been transferred to the container; a determination apparatus configured to determine whether the article to be transferred by the transferring apparatus is a type 1 article or a type 2 article; and a control apparatus configured to control the transfer apparatus and the pressing apparatus based on determination information from the determination apparatus, wherein the transfer apparatus transfers the article to the container while holding an upper face of the package, the type 1 article is an article that is the package that air is more likely to enter than the type 2 article, when being transferred by the transfer apparatus, and the control apparatus performs both a transfer control to cause the transfer apparatus to transfer the article to the container and a first pressing control to cause the pressing apparatus to press, from above, the article that has been transferred to the container through the transfer control if the article to be transferred by the transfer apparatus is the type 1 article, and performs only the transfer control, of the transfer control and the first pressing control, if the article to be transferred by the transfer apparatus is the type 2 article.

With this configuration, in the case of transferring the type 1 article that air is relatively likely to enter, using the transfer apparatus, air that has flowed into the package of the article can be discharged by performing the transfer control to cause the transfer apparatus to transfer the article to a container, and performing the first pressing control to cause the pressing apparatus to press, from above, the article in the container. As a result, the volume of the article contained in the container can be kept small.

In the case of transferring a type 2 article that air is relatively unlikely to enter, using the transfer apparatus, the article is transferred to a container using the transfer apparatus by performing the transfer control, but the first pressing control is not performed. As a result, the article can be efficiently transferred to the container.

Accordingly, the storage efficiency of the container can be increased while efficiently transferring the article that is the package containing the contained item.

DETAILED DESCRIPTION OF PREFERRED EMBODIMENTS

1. Embodiment

An embodiment of an article transport facility will be described based on the drawings.

Figure 1:
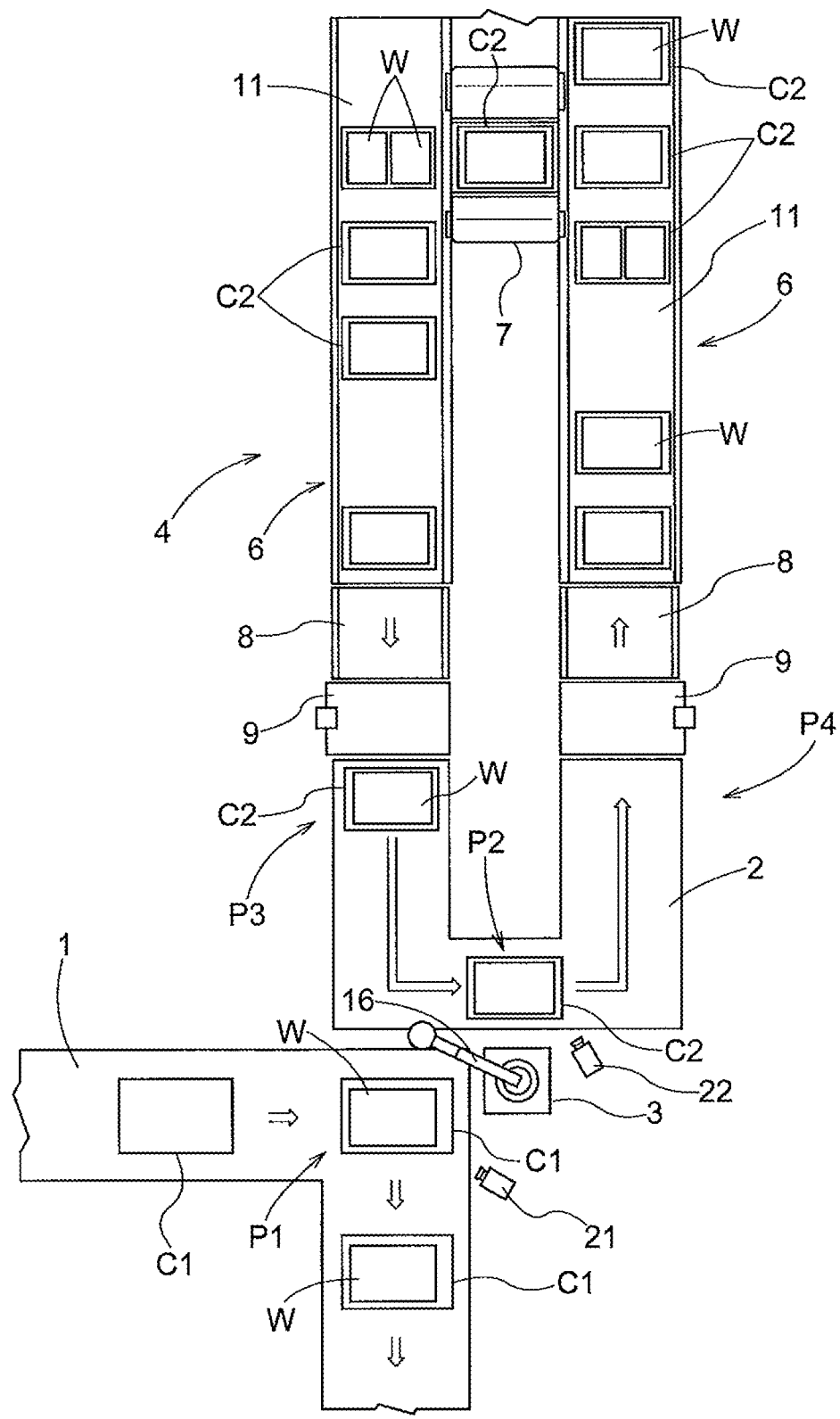
FIG. 1 is a plan view of an article transport facility.

As shown in FIG. 1, an article transport facility includes a first transport apparatus 1 for transferring first containers C1, a second transport apparatus 2 for transferring second containers C2, a transfer apparatus 3 for transferring articles W contained in the second containers C2 to the first containers C1 and putting the articles W into the first container C1, and an automated storage 4 for keeping the second container C2.

Automated Storage

As shown in FIG. 1, the automated storage 4 includes storage shelves 6, a transport carriage 7, relay conveyers 8, and lift apparatuses 9.

A pair of storage shelves 6 is installed while being spaced apart. A plurality of shelf plates 11 are arranged in the up-down direction in each storage shelf 6. The storage shelves 6 store the second containers C2 in a state of supporting the second containers C2 on the shelf plates 11.

The transport carriage 7 travels between the two storage shelves 6 along these storage shelves 6 to transport the second containers C2.

The relay conveyers 8 include loading relay conveyers 8, which are used to put the second containers C2 onto the storage shelves 6, and unloading relay conveyers 8, which are used to take the second containers C2 out of the storage shelves 6. A plurality of pairs of these relay conveyers 8 are arranged in the up-down direction in correspondence with the number of shelf plates 11 in the storage shelves 6. The lift apparatuses 9 include a loading lift apparatus 9 and an unloading lift apparatus 9. These lift apparatuses 9 each have a conveyer. The loading lift apparatus 9 can receive the second containers C2 from the second transport apparatus 2, and deliver the second containers C2 to the second transport apparatus 2. The unloading lift apparatus 9 can receive the second containers C2 from the unloading relay conveyer 8, and deliver the second containers C2 to the second conveying apparatus 2.

The automated storage 4 transports each second container C2 stored in the storage shelves 6 to a unloading position P3 using the transport carriage 7, the relay conveyer 8, and the lift apparatus 9, and this second container C2 is taken out of the automated storage 4. Also, the automated storage 4 transports each second container C2 located at a loading position P4 to the storage shelf 6 using the lift apparatus 9, the relay conveyer 8, and the transport carriage 7, and this second container C2 is thus put into the automated storage 4.

First Transport Apparatus and Second Transport Apparatus

The first transport apparatus 1 is constituted by a conveyer, such as a roller conveyer, and transports the first containers C1 in one direction. A first position P1 is set at an intermediate position on a transport path of the first transport apparatus 1. The first transport apparatus 1 transports each first container C1 from a transport origin, which is outside the drawing, to the first position P1, and transports this first container C1 from the first position P1 to a transport destination, which is outside the drawing. No article W is contained in the first container C1 that is transported to the first position P1 by the first transport apparatus 1, but an article W, which has been transferred by the transfer apparatus 3, is contained in a first container C1 that is transported from the first position P1 by the first transport apparatus 1.

The second transport apparatus 2 is constituted by a conveyer, such as a roller conveyer, and transports second containers C2 in one direction. The unloading position P3 is set at an upstream end portion of the transport path of the second transport apparatus 2, and the loading position P4 is set at a downstream end of the transport path of the second transport apparatus 2. Also, a second position P2 is set at an intermediate position on the transport path of the second transport apparatus 2. The second transport apparatus 2 transports each second container C2 from the unloading position P3 to the second position P2, and transports the second container C2 from the second position P2 to the loading position P4. One or more articles W are contained in each second container C2 that is transported to the second position P2 by the second transport apparatus 2. The articles W contained in one second container C2 are of the same type.

That is to say, in the transport facility, an empty first container C1 is transported to the first position P1 by the first transport apparatus 1, and meanwhile, a second container C2 containing articles W is taken out of the automated storage 4, and the second container C2 taken out of the automated storage 4 is transported to the second position P2 by the second transport apparatus 2.

Then, the transfer apparatus 3 takes the articles W out of the second container C2 located at the second position P2, and transfers the articles W from the second container C2 to the first container C1 so that the articles W taken out of the second container C2 are contained in the first container C1 located at the first position P1. The second container C2 of which all of the articles W to be taken out have been taken out is transported from the second position P2 and is put into the automated storage 4 by the second transport apparatus 2. The first container C1 in which all of the articles W to be contained are contained is transported from the first position P1 by the first transport apparatus 1. In the following description, of the articles W contained in a second container C2 that has been transported to the second position P2, each of the articles W to be transferred to a first container C1 will be referred to as an article W to be transferred.

Container

As shown in FIGS. 4 to 8, each first container C1 includes a rectangular supporting portion 13 for supporting articles W from below, and side wall portions 14, which are raised from four sides that form an outer periphery of the supporting portion 13. The first container C1 is formed into a box shape that is open in its upper face. A supporting face 13A for supporting articles W from below is formed by an upper face of the supporting portion 13. Assuming that a direction parallel to the supporting face 13A of the first container C1 is an alignment direction Y, and a direction perpendicular to the alignment direction is a stacking direction X, the first container C1 is formed to have a size that allows articles W to be contained in a state of being arranged in the alignment direction Y and the stacking direction X, on the supporting face 13A. Although not shown in the diagrams, the direction perpendicular to the sheets of FIGS. 4 to 8 is also the alignment direction Y parallel to the supporting face 13A. The second container C2 is formed into a box shape that is open in its upper face, similarly to the first container C1, and a description thereof is omitted accordingly.

In this embodiment, corrugated fiberboard boxes are used as the first containers C1, and foldable containers are used as the second containers C2. Note that each first container C1 corresponds to a container to which an article W is transferred by the transfer apparatus 3.

Article

Figure 2:
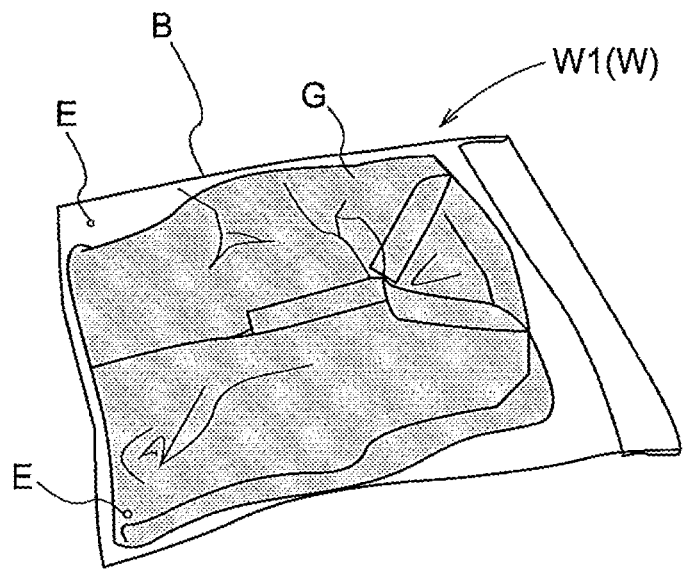
FIG. 2 is a perspective view of an article.

As shown in FIG. 2, an article W has a package B containing a contained item G. There are a plurality of types of articles W, and at least one of the package B and the contained item G differs between different types of articles W. In the this embodiment, each package B is, for example, a soft bag that is made of synthetic resin, or a paper box that is not very soft, and each contained item G is clothing or an accessory, such as a garment, socks, slippers, or sunglasses. That is to say, the articles W include an article W that has a bag-shaped package B containing a garment G serving as a contained item G, such as one shown in FIG. 2, an article that has a cardboard package B containing slippers serving as a contained item G, and the like.

Also, there are articles W in which contained items G contained in packages B are not relatively easily broken (e.g. an article W that contains a garment as a contained item G), and articles W in which contained items G contained in packages B are relatively easily broken (e.g. an article W that contains sunglasses as a contained item G).

An article W using a soft bag as the package B and also using a soft garment as the contained item G is relatively likely to lose its shape, and is soft. In contrast, an article W using a cardboard box that is not very soft as a package B, and an article W in which a paperboard that is not very soft is contained together with the contained item G in the package B are relatively unlikely to lose their shape, and are not very soft. Thus, the articles W may have different softnesses depending on the type.

The articles W may include articles W that have packages B with ventilation holes E, such as one shown in FIG. 2, and articles W with packages B with no ventilation hole E. Even the articles W that have packages B with ventilation holes E may have different sizes or numbers of ventilation holes E. Furthermore, the articles W may have different softnesses depending on the type, as mentioned above. For this reason, when being held and lifted up by the transfer apparatus 3, some articles W are likely to lose their shape and air is likely to enter the packages B thereof from the ventilation holes E, whereas air is not likely to enter the packages B of other articles W because these articles W do not lose their shape, or the articles W lose their shape but have no ventilation hole E or small ventilation holes E.

Transfer Apparatus

Figure 4:
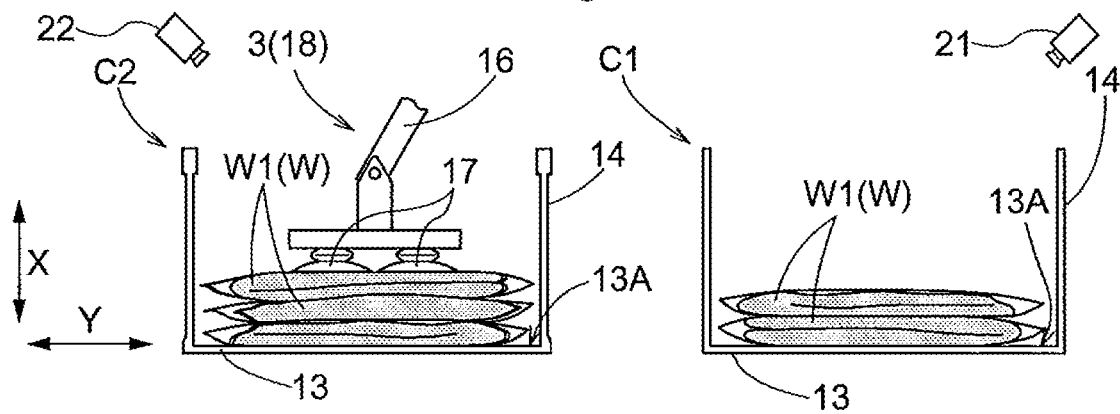
FIG. 4 illustrates a state of transferring type 1 articles.
Figure 5:
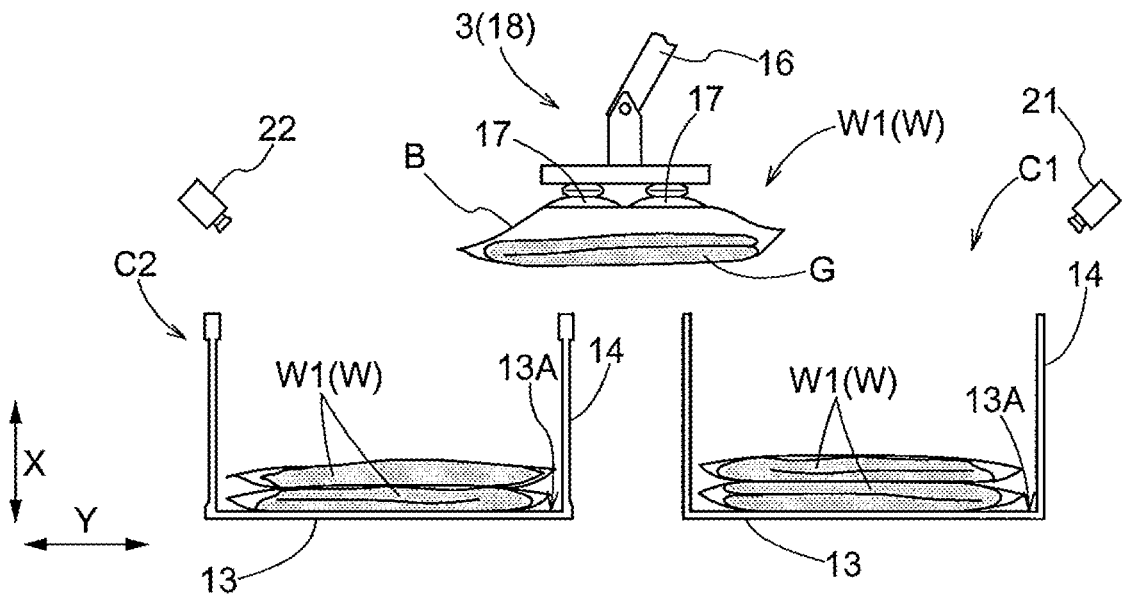
FIG. 5 illustrates a state of transferring type 1 articles.

As shown in FIGS. 4 to 8, the transfer apparatus 3 includes an articulated arm 16 and a suction pad 17 supported at a leading end of the arm 16, and can support an article W while being attached via suction to the upper face thereof using the suction pad 17. As shown in FIG. 4, the transfer apparatus 3 uses suction to attach and hold, using the suction pad 17, the upper face of an article W contained in a second container C2 located at the second position P2. Then, as shown in FIG. 5, the transfer apparatus 3 takes the article W out of the second container C2 and puts this article W into a first container C1 located at the first position P1, and thereafter release the suction of the suction pad 17 being attached to the article W to transfer the article W from the second container C2 to the first container C1. Thus, the transfer apparatus 3 transfers an article W to a first container C1 while holding the upper face of a package B, which serves as the upper face of the article W. Note that the suction pad 17 corresponds to a holding portion that is provided in the transfer apparatus 3 and holds the upper face of an article W. The "upper face" of an article refers to an upward direction of an article W in a state of being contained in a first container C1 or a second container C2, and the "upward direction" refers to one direction of the stacking direction X.

In this embodiment, the transfer apparatus 3 is provided with the suction pad 17 shown in FIGS. 4 to 8 opposing the supporting face 13A. A plurality of suction pads 17 are aligned in the alignment direction Y. The transfer apparatus 3 selects some or all of the plurality of suction pads 17 in accordance with the type of the article W, particularly the size of the upper face of the article W, and uses suction to attach and support the article using the selected suction pads 17.

Figure 6:
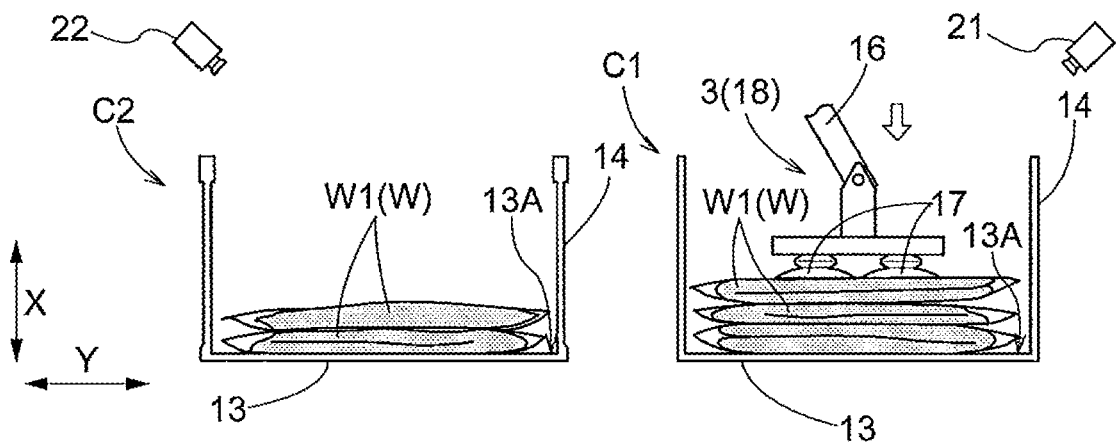
FIG. 6 illustrates a state of pressing the type 1 articles.

As shown in FIG. 6, the transfer apparatus 3 can press, from above, articles W contained in a first container C1 using a corresponding suction pad 17 by lowering the suction pad 17 in a state of being located immediately above the articles W contained in the first container C1. That is to say, the transfer apparatus 3 is also used as a pressing apparatus 18 for pressing, from above, articles W that have been transferred to a first container C1. Also, as shown in FIG. 3, the transfer apparatus 3 includes a pressing sensor 19 for detecting a pressing force when articles W are pressed from above by the suction pad 17.

Control Apparatus

Figure 3:
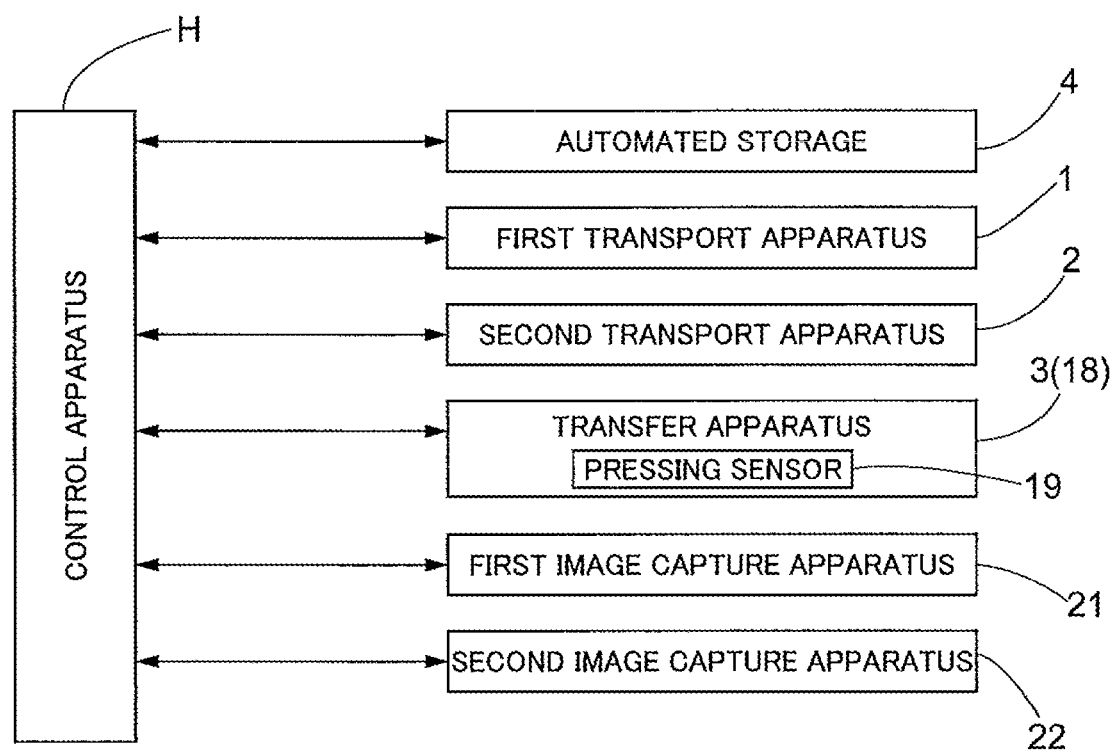
FIG. 3 is a control block diagram.

As shown in FIG. 3, the transport facility includes the first transport apparatus 1, the second transport apparatus 2, the transfer apparatus 3, and a control apparatus H for controlling the automated storage 4.

Each article W is assigned an article code, which differs depending on the type. The article code and article information are stored in association with each other in the control apparatus H. The article information is information indicating the length, width, height, and weight of each article W, pattern information, the degree to which air enters the package B, the fragility and the centroid position of the article W, and so on.

Each articles W is classified into one of a type 1 article W1, which has a package B that air is more likely to enter than a predetermined level when the article W is transferred by the transfer apparatus 3, and a type 2 article W2, which has a package B that air is less likely to enter than the predetermined level when the article W is transferred by the transfer apparatus 3. That is to say, there are two types of articles W, namely the type 1 article W1 and the type 2 article W2, and the type 1 article W1 is an article W that has a package B that air is more likely to enter when the article W is transferred by the transfer apparatus 3, than the type 2 article W2.

Information regarding whether each article W is the type 1 article W1 or the type 2 article W2 serves as the information indicating the degree to which air enters the package B, of the article information stored in the control apparatus H. This information allows the control apparatus H to determine whether each article W to be transferred is the type 1 article W1 or the type 2 article W2, based on the information indicating the degree to which air is likely to enter the package B. That is to say, the control apparatus H has a function of a determination apparatus 23 for determining whether each article W to be transferred by the transfer apparatus 3 is the type 1 article W1 or the type 2 article W2. The control apparatus H controls the transfer apparatus 3 based on determination information, i.e. information regarding the result of determining whether each article W is the type 1 article W1 or the type 2 article W2.

Each contained item G is classified into one of a type 1 contained item, which is more easily broken than a predetermined level when pressed in the up-down direction while being contained in a package B, and a type 2 contained item, which is less easily broken than the predetermined level when pressed in the up-down direction while being contained in the package B. That is to say, there are two types of contained items G, namely the type 1 contained item and the type 2 contained item, and the type 1 contained item is a contained item G that is more easily broken than the type 2 contained item.

Information regarding whether each article W contains a contained item G that belongs to the type 1 contained item in the package B or a contained item G that belongs to the type 2 contained item in the package B serves as the information indicating the fragility of the article W, of the article information stored in the control apparatus H. The control apparatus H can determine whether the contained item G contained in each article W to be transferred is the type 1 contained item or the type 2 contained item, based on the information indicating the fragility of the article W. Furthermore, the control apparatus H can determine whether or not one or more articles W that have already been transferred into a first contained C1 includes an article W that contains a contained item G that belongs to the type 1 contained item in the package B.

Also, storage position information regarding each second container C2 kept in the automated storage 4 and a product code of the article W contained in this second container C2 are stored in association with each other in the control apparatus H.

Furthermore, the control apparatus H receives order information from a plurality of shipping destinations. The order information includes code information indicating a product code that is set for each type of article W, and quantity information indicating the quantity of the articles W of the type that corresponds to the product code indicated by the code information.

Also, the control apparatus H receives image capture information from the first image capture apparatus 21 and image capture information from the second image capture apparatus 22. The first image capture apparatus 21 is installed so as to be able to capture an image of a first container C1 located at the first position P1, and articles W contained in the first container C1 if this first container C1 is transparent or translucent. The second image capture apparatus 22 is installed so as to be able to capture an image of a second container C2 located at the second position P2, and articles W contained in this second container C2 from the opening formed in the upper face thereof.

Based on the image capture information from the second image capture apparatus 22, the control apparatus H recognizes the presence of the articles W in the second container C2 located at the second position P2, and determines the type of the articles W whose presence has thus been recognized. More specifically, based on the image capture information from the second image capture apparatus 22, the control apparatus H detects a region higher than the supporting face 13A of the second container C2, and determines that articles W are present in the region higher than the supporting face 13A. The control apparatus H also performs image processing, such as pattern matching, on the region higher than the supporting face 13A based on the pattern information, and determines the type of the present article W.

Based on the image capture information from the first image capture apparatus 21, the control apparatus H determines the orientation and position of the articles W contained in the first container C1 located at the first position P1, and determines whether or not the articles W are contained in the first container C1 in accordance with the arrangement indicated by arrangement information.

Figure 10:
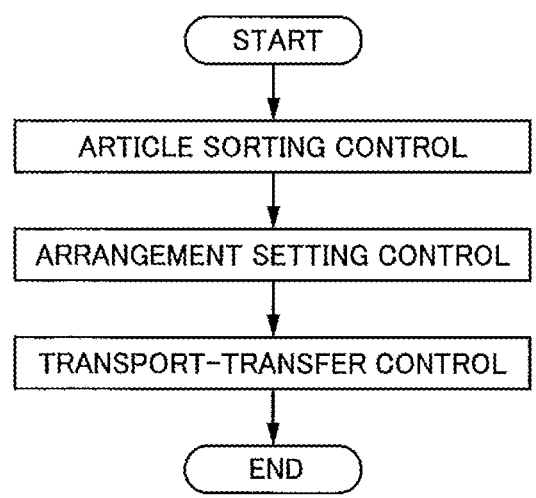
FIG. 10 is a flowchart of a transfer control.

As shown in FIG. 10, the control apparatus H performs an article sorting control, an arrangement setting control, and a transport-transfer control, in this order. The article sorting control is a control to set the quantity of the first containers C1 for stacking articles W to be transferred, indicated by the order information. The arrangement setting control is a control to set the arrangement, in a first container C1, of one or more articles W to be transferred and contained in one first container C1, and to set article order, namely the order in which the articles W are stacked in the first container C1 in accordance with the arrangement. The transport-transfer control is a control that is performed based on the set arrangement and article order, to control the first transport apparatus 1, the second transport apparatus 2, and the transfer apparatus 3 so as to transfer articles W to be transferred to a first container C1 in the orientation and position indicated by the arrangement, in the order indicated by the article order.

Article Sorting Control

The article sorting control sets the quantity of the first containers C1 to contain articles W to be transferred indicated by the order information.

Specifically, articles W are contained so that the total volume of the articles W contained in one first container C1 is less than or equal to a set volume, i.e. a volume set for the first container C1 for containing these articles W, in accordance with the volume and quantity of the articles W to be transferred indicated by the order information. In this embodiment, the set volume is 60% of the accommodatable volume of the first container C1. If the total volume of the articles W to be transferred indicated by the order information is 60% or less of the accommodatable volume of the first container C1, the articles W to be transferred are regarded as being able to be contained in one first container C1, and the quantity of the first containers C1 is set to 1. If the total volume of the articles W to be transferred indicated by the order information exceeds 60% of the accommodatable volume of the first container C1, the quantity of the first containers C1 is set to 2 or more so that the total volume of the articles W to be contained in each first container C1 is 60% or less of the accommodatable volume thereof.

Arrangement Setting Control

The arrangement setting control sets the arrangement that indicates the orientation and position, in a first container C1, of one or more articles W to be contained in one first container C1 so that the height of the articles W does not exceed a set height H1. Also, the arrangement setting control is to set article order, which is the order in which the articles W are stacked in the first container C1 so as to be able to stack the articles in accordance with the set arrangement. The height of the articles W that is set through the arrangement setting control will be referred to as a scheduled storage height H2.

Transport-Transfer Control

The transport-transfer control causes one or more articles W from one or more second containers C2 to be contained in one first container C1 by performing a first transport control, a second transport control, and a transfer-containing control. At this time, all of the articles W to be transferred indicated by the order information are transferred to the one first container C1, and are contained in the arrangement indicated by the arrangement information.

The second transport control controls the second transport apparatus 2 and the automated storage 4 to transport a second container C2 from the storage shelf 6 to the second position P2 and, after all of the articles W to be transferred contained in the second container C2 have been taken out at the second position P2 by the transfer apparatus 3, transport this second container C2 from the second position P2 to the storage shelf 6.

The first transport control controls the first transport apparatus 1 to transport an empty first container C1 from the outside to the first position P1 and, after all of the articles W to be transferred that are to be contained in the first container C1 at the first position P1 have been put therein by the transfer apparatus 3, transports this first container C1 from the first position P1 to the outside.

The transfer-containing control controls the transfer apparatus 3 to unload the articles W to be transferred that are contained in the second container C2 at the second position P2, and put the articles W into the first container C1 at the first position P1 in the arrangement indicated by the arrangement information.

Transfer-Containing Control

Next, the transfer-containing control will be described.

If the articles W to be transferred by the transfer apparatus 3 are the type 1 articles W1, the control apparatus H performs both a transfer control to cause the transfer apparatus 3 to transfer the articles W to the first container C1, and a first pressing control to cause the transfer apparatus 3 to press, from above, the articles W that have been transferred to the first container C1 through the transfer control. If the articles W to be transferred by the transfer apparatus 3 are the type 2 articles W2, the control apparatus H performs only the transfer control, of the transfer control and the first pressing control.

After having performed only the transfer control, of the transfer control and the first pressing control, or both the transfer control and the first pressing control, the control apparatus H performs a second pressing control to cause the transfer apparatus 3 to press, from above, the one or more articles W in the first container C1 if the height 113 of the one or more articles W in the container C1 is higher than the set height H1 that is set in advance.

In the case of performing the first pressing control or the second pressing control, if none of the articles W in the container contains the type 1 contained item, the control apparatus H causes the transfer apparatus 3 to press, from above, the articles W in the container at a second set pressure. If any of the articles W in the first container C1 contains the type 1 contained item, the control apparatus H causes the transfer apparatus 3 to press the articles W in the first container C1 at a first set pressure, which is lower than the second set pressure.

The transfer control includes a suction-moving control to cause a suction pad 17 to use suction to attach the upper face of each of the articles W to be transferred that are contained in each second container C2 to hold each of the articles W to be transferred, and then transfer the articles W to be transferred in the arrangement indicated by the arrangement information in the first container C1, and a suction-release control to release the suction of the suction pad 17 being attached to the article W to be transferred. In the case of transferring the articles W to the first container C1 through the suction-moving control, each article W is put on a placement face 17A of the first container C1 or another article W that has been priorly transferred to the first container C1.

The first pressing control is a control performed between the suction-moving control and the suction-release control in the transfer control, and is a control to lower a suction pad 17 in a state of being attached via suction to the upper face of an article W to be transferred and thus cause the suction pad 17 to press, from above, articles W that have already been transferred to the first container C1.

The second pressing control is a control performed after the transfer control has been completed, and is a control to lower a suction pad 17 in a state of not being attached via suction to the upper face of the article W to be transferred and thus cause the suction pad 17 to press, from above, the articles W that have already been transferred to the first container C1.

Figure 11:
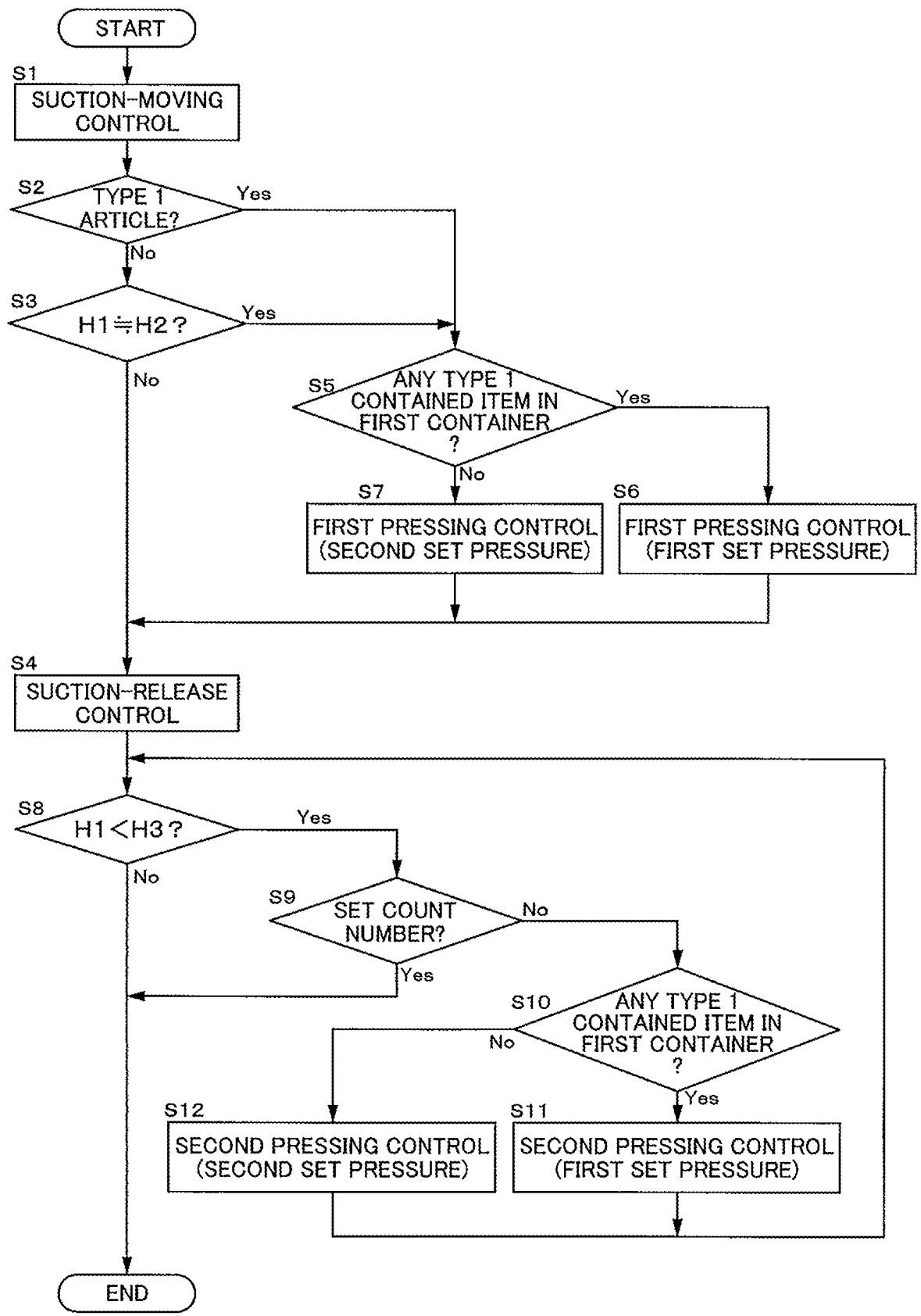
FIG. 11 is a flowchart of a transfer-containing control.

A further description will be given of the transfer control, based on the flowchart shown in FIG. 11.

During the transfer control, if an article W to be transferred is not the type 1 article W1 with a package B that air is likely to enter (i.e. is the type 2 article W2), and the scheduled storage height H2 is sufficiently lower than the set height H1, the suction-moving control is performed, and thereafter, the suction-release control is performed without performing the first pressing control (S1 to S4). Also, during the transfer control, if an article W to be transferred is the type 1 article W1, the suction-moving control is performed, the first pressing control is then performed, and thereafter, the suction-release control is performed (S1, S2, S5 to S7). Also, during the transfer control, even if an article W to be transferred is not the type 1 article W1 (i.e. is the type 2 article W2), if the set height H1 is close to the scheduled storage height H2 (specifically, if the difference therebetween is several percent or less), the suction-moving control is performed, the first pressing control is then performed, and thereafter, the suction-release control is performed (S1 to S3, S5 to S7). In the case of performing the first pressing control, if none of the articles W in the container contains the type 1 contained item that are easily broken, the articles W in the first container C1 are pressed at the second set pressure (S5, S7). If any of the articles W in the first container C1 contains the type 1 contained item, the articles W in the first container C1 are pressed at the first set pressure that is lower than the second set pressure (S5, S6).

Thus, the control apparatus H places the article W held by the suction pad 17 on the placement face 17A of the first container C1 or another article W that has been priorly transferred to the first container C1, then lowers the suction pad 17 to press, from above, the held article W, and thereafter performs the transfer control and the first pressing control so as to release the hold of the suction pad 17 holding the article W.

After the transfer control for the article W to be transferred has been completed, if the height H3 of the articles W contained in the first container C1 is less than or equal to the set height H1 based on the image capture information from the first image capture apparatus 21, the transfer-containing control for this article W to be transferred ends (S8). After the transfer control for the article W to be transferred has been completed, if the height H3 of the articles W contained in the first container C1 exceeds the set height H1, the second pressing control is repeatedly performed until the height H3 of the articles W contained in the first container C1 is less than or equal to the set height H1, or until the number of times that the second pressing control is performed reaches a set count number (S8 to S12). In the case of performing the second pressing control, if none of the articles W in the first container C1 contains the type 1 contained item that is easily broken, the articles W in the first container C1 are pressed at the second set pressure (S10, S12). If any of the articles W in the first container C1 contain the type 1 contained item, the articles W in the first container C1 are pressed at the first set pressure that is lower than the second set pressure (S10, S11).

Figure 7:
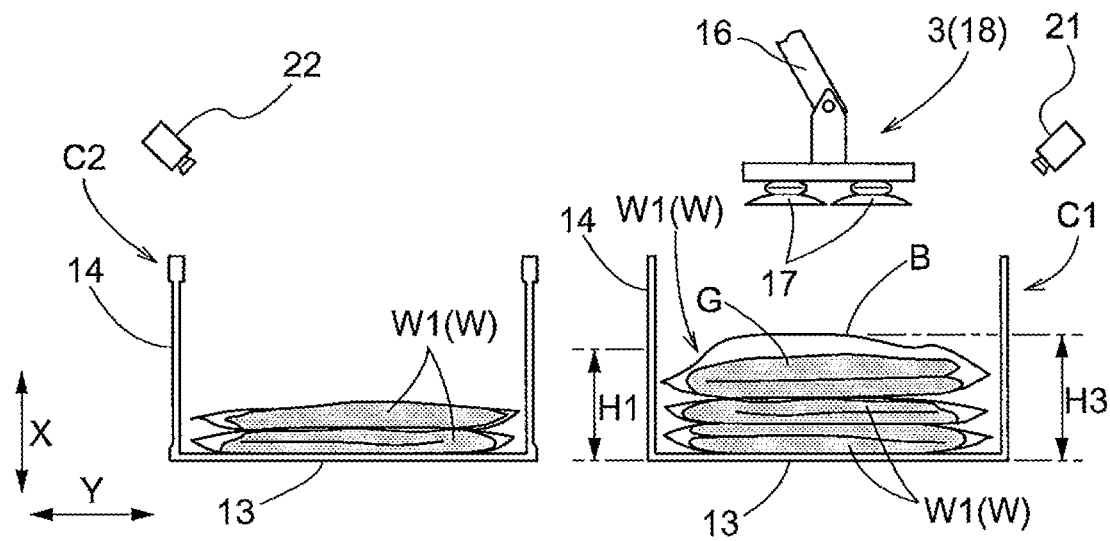
FIG. 7 illustrates a state where the type 1 articles that have been transferred to a container have expanded.
Figure 8:
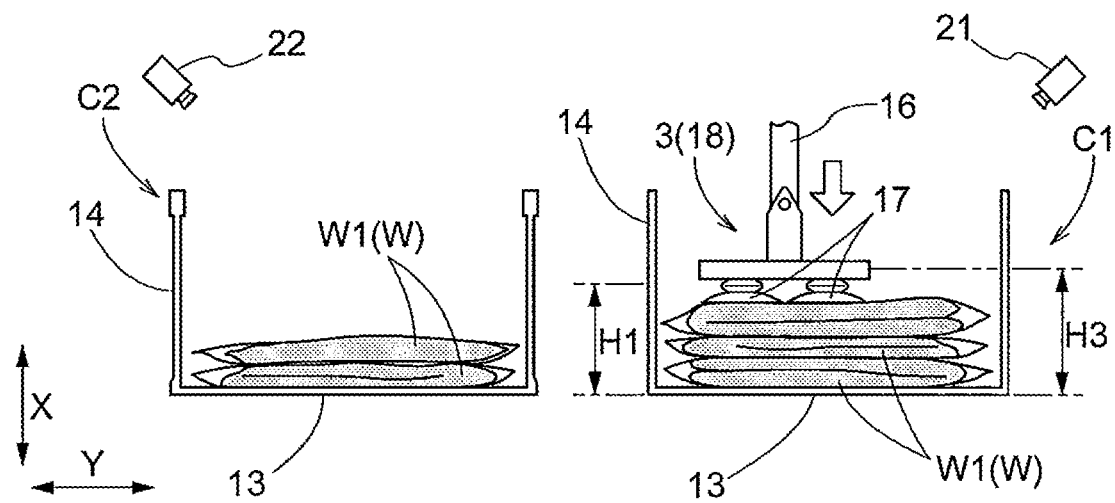
FIG. 8 illustrates a state of pressing the type 1 articles.
Figure 9:
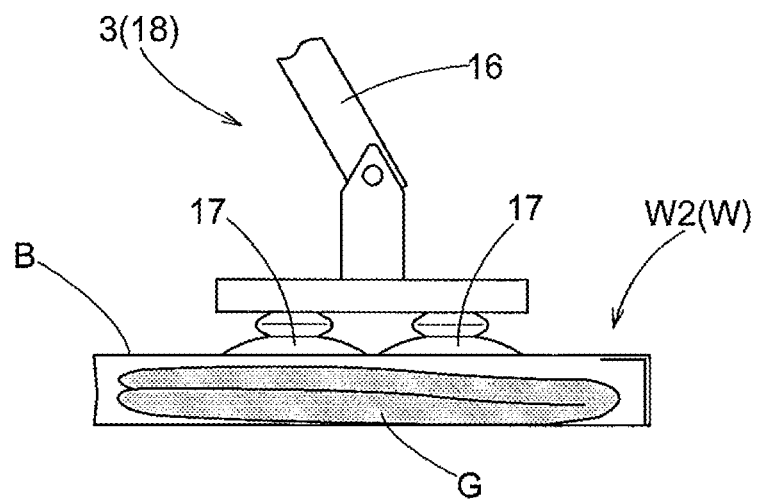
FIG. 9 illustrates a state of transferring a type 2 article.

As shown in FIGS. 7 and 8, during the second pressing control, the highest portion of one or more articles W in a first container C1 is pressed by the transfer apparatus 3. When "the highest portion is pressed by the transfer apparatus 3", the highest portion of the articles W in the first container C1 need only be located between an end portion of a suction pad 17 located on one side in the alignment direction Y, of the plurality of suction pads 17 aligned in the alignment direction Y in an orientation to press the articles W, the end portion also being on the one side, and an end portion of a suction pad 17 located on the other side in the alignment direction Y, the end portion being also on the other side. For this reason, for example, there may be cases of pressing, from above, the articles W using a suction pad 17 with the highest portion of the articles W in the first container C1 being located between adjacent suction pads 17 arranged in the alignment direction Y, and the highest portion of the articles W in the first container C1 do not necessarily have to be pressed directly by a suction pad 17.

2. Other Embodiments

Next, other embodiments of the article transport facility will be described.

(1) In the above embodiment, the set pressures are the same for the first pressing control and the second pressing control. However, the set pressures may differ between the first pressing control and the second pressing control.

Specifically, for example, the first set pressure for the first pressing control may be set higher or lower than the first set pressure for the second pressing control, and the second set pressure for the first pressing control may be set higher or lower than the second set pressure for the second pressing control.

(2) In the above embodiment, during the second pressing control, the highest portion of one or more articles W in a container is pressed by the pressing apparatus 18. However, during the second pressing control, the portion that has been held by the transfer apparatus 3 may alternatively be pressed by the pressing apparatus 18.

(3) In the above embodiment, during both the first pressing control and the second pressing control, the articles W are pressed at the first set pressure by the pressing apparatus 18 if any of the articles W in a first container C1 contains the type 1 contained item that is easily broken. However, during at least one of the first pressing control and the second pressing control, the articles W may alternatively be pressed at the second set pressure by the pressing apparatus 18 even if any of the articles W in the first container C1 contains the type 1 contained item. The articles W may not be pressed by the pressing apparatus 18 if any of the articles W in the first container C1 contains the type 1 contained item.

(4) In the above embodiment, the transfer apparatus 3 is also used as the pressing apparatus 18, but the pressing apparatus 18 may alternatively be provided separately from the transfer apparatus 3.

(5) In the above embodiment, the transfer apparatus 3 includes the suction pads 17, and each article W is held by causing a suction pad 17 to use suction to attach to the upper face of the article W. However, a gripping portion may also be provided in the transfer apparatus 3, and each article W may be held by causing the gripping portion to hold the upper face of the article W from two opposite sides.

(6) The above embodiment has described, as an example, the case where each article W is classified into one of the type 1 article W1 and the type 2 article W2, in accordance with the degree to which air is likely to enter. However, this may not necessarily be the case, and each of the type 1 article W1 and the type 2 article W2 may further be classified into a plurality of types, in accordance with the degree to which air is likely to enter. In this case, for example, a control other than the transfer control and the first pressing control may be performed on articles of each type, or the pressing force for the first pressing control may be differentiated. Also, another classification may further be applied in accordance with characteristics other than the degree to which air is likely to enter, e.g. the rigidity, shape, material, or the like of each package B. In this case, a control other than the control performed in the above embodiment may be performed on articles other than the type 1 article W1 and the type 2 article W2.

(7) In this embodiment, a corrugated fiberboard box is used as each first container C1, but a foldable container may alternatively be used as each first container C1. In the case of using a corrugated fiberboard box as each first container C1, a corrugated fiberboard box may be used whose side faces can be internally folded so that the height of the side faces is variable (i.e. the capacity is variable).

(8) In the above embodiment, articles of one type are contained in one second container C2, but articles of two or more types may alternatively be contained in one second container C2. Also, each second container C2 may also be provided with a partition for separating the space in the second container C2 into a plurality of areas, and articles W of different types may be contained in different areas in the case where articles W of two or more types are contained in one second container C2 as mentioned above.

(9) In the above embodiment, each contained item G is clothing or an accessory, but each contained item G may alternatively be an item other than clothing or an accessory, e.g. may be food, an everyday item, or the like.

(10) Note that the configurations disclosed in the above embodiment may be combined with the configurations disclosed in the other embodiments for application, provided there is no inconsistency. Regarding other configurations as well, the embodiments disclosed in this specification are merely examples in all aspects. Accordingly, various modifications may be made as appropriate without departing from the gist of the present disclosure.

3. Summary of the Above Embodiment

A summary of the above-described article transport facility will be described below.

An article transport facility that includes a transfer apparatus for transferring, to a container, an article that is a package containing a contained item, includes: a pressing apparatus configured to press, from above, the article that has been transferred to the container; a determination apparatus configured to determine whether the article to be transferred by the transferring apparatus is a type 1 article or a type 2 article; and a control apparatus configured to control the transfer apparatus and the pressing apparatus based on determination information from the determination apparatus, wherein the transfer apparatus transfers the article to the container while holding an upper face of the package, the type 1 article is an article that is the package that air is more likely to enter than the type 2 article, when being transferred by the transfer apparatus, and the control apparatus performs both a transfer control to cause the transfer apparatus to transfer the article to the container and a first pressing control to cause the pressing apparatus to press, from above, the article that has been transferred to the container through the transfer control if the article to be transferred by the transfer apparatus is the type 1 article, and performs only the transfer control, of the transfer control and the first pressing control, if the article to be transferred by the transfer apparatus is the type 2 article.

With this configuration, in the case of transferring the type 1 article that air is relatively likely to enter, using the transfer apparatus, air that has flowed into the package of the article can be discharged by performing the transfer control to cause the transfer apparatus to transfer the article to a container, and performing the first pressing control to cause the pressing apparatus to press, from above, the article in the container. As a result, the volume of the article contained in the container can be kept small.

In the case of transferring the type 2 article that air is relatively unlikely to enter, using the transfer apparatus, the article is transferred to a container using the transfer apparatus by performing the transfer control, but the first pressing control is not performed. As a result, the article can be efficiently transferred to the container.

Accordingly, the storage efficiency of the container can be increased while efficiently transferring the article that is the package containing the contained item.

Here, it is preferable that, after the control apparatus has performed only the transfer control, of the transfer control and the first pressing control, or both the transfer control and the first pressing control, if the height of one or more articles in the container is higher than a set height that is set in advance, the control apparatus performs a second pressing control to cause the pressing apparatus to press, from above, the one or more articles in the container.

With this configuration, after the type 1 article has been transferred to a container by the transfer apparatus or after the type 2 article has been transferred by the transfer apparatus, if the height of articles that have already been transferred to the container that contains the above-transferred article is higher than the set height, the second pressing control can be performed to cause the pressing apparatus to press, from above, the articles in the container. Thus, air that has flowed into the packages of the articles can be discharged therefrom, and as a result, the volume of the articles contained in the container can be kept smaller.

Also, it is preferable that, during the second pressing control, a highest portion of the one or more articles in the container is pressed by the pressing apparatus.

With this configuration, by performing the second pressing control to cause the pressing apparatus to press the highest portion of the articles in the container, air that has flowed into the packages of the articles can be efficiently discharged therefrom, and the height of the entire articles in the container can be made as uniform as possible so as to facilitate posting of the container, for example.

It is preferable that the contained item is one of a type 1 contained item and a type 2 contained item, the type 2 contained item is a contained item that is more easily broken than the type 1 contained item, and during the first pressing control, if the container contains no article that contains the type 2 contained item, the control apparatus causes the pressing apparatus to press, from above, the article in the container at a first set pressure, and if an article in the container contains the type 2 contained item, the control apparatus causes the pressing apparatus to press the article in the container at a second set pressure, which is lower than the first set pressure.

With this configuration, if none of the articles in the container contains the type 1 contained item that is relatively easily broken, the articles in the container are pressed at the second set pressure at the pressing apparatus. Thus, even if the articles are pressed at the second set pressure that is relatively high, the contained items contained can be prevented from being broken. Also, by pressing the articles at the second set pressure, air that has flowed into the packages can be readily discharged from the packages appropriately.

If any of the articles in the container contains the type 1 contained item that is relatively easily broken, articles in the container are pressed at the first set pressure by the pressing apparatus. Thus, by pressing the articles at the first set pressure that is relatively low, air can be discharged from the packages while restraining the type 1 contained item from being broken.

It is preferable that the transfer apparatus includes a holding portion for holding the upper face of the article and is also used as the pressing apparatus, and the control apparatus performs the transfer control and the first pressing control so as to put the article held by the holding portion on a placement face of the container or on another article that has been priorly transferred to the container, then lower the holding portion to press the held article from above using the holding portion, and thereafter release the hold of the holding portion holding the article.

With this configuration, since the transfer apparatus is also used as the pressing apparatus, an apparatus exclusively for pressing does not need to be provided separately from the transfer apparatus, and the configuration of the article transport facility can be simplified. Also, the articles are pressed by the transfer apparatus without releasing the hold of the holding portion holding an article when being transferred, it is possible to efficiently transfer and press the articles compared with the case of causing the transfer apparatus to press the articles after temporarily releasing the hold of the holding portion holding the article.

The technique according to this disclosure can be used for an article transport facility that includes a transfer apparatus for transferring an article to a container.

What is claimed is:

1. An article transport facility that includes a transfer apparatus for transferring, to a container, an article that is a package containing a contained item, the article transport facility comprising:
    a pressing apparatus configured to press, from above, the article that has been transferred to the container;
    a control apparatus configured to:
        determine whether the article to be transferred by the transferring apparatus is a type 1 article or a type 2 article; and
        control the transfer apparatus and the pressing apparatus based on determination information from the determination apparatus,
    wherein:
    the transfer apparatus transfers the article to the container while holding an upper face of the package,
    the type 1 article is an article that is the package that air is more likely to enter than the type 2 article, when being transferred by the transfer apparatus, and
    the control apparatus performs both a transfer control to cause the transfer apparatus to transfer the article to the container and a first pressing control to cause the pressing apparatus to press, from above, the article that has been transferred to the container through the transfer control if the article to be transferred by the transfer apparatus is the type 1 article, and performs only the transfer control, of the transfer control and the first pressing control, if the article to be transferred by the transfer apparatus is the type 2 article.

2. The article transport facility according to claim 1, wherein, after the control apparatus has performed only the transfer control of the transfer control and the first pressing control or both, the transfer control and the first pressing control, if the height of one or more articles in the container is higher than a set height that is set in advance, the control apparatus performs a second pressing control to cause the pressing apparatus to press, from above, the one or more articles in the container.

3. The article transport facility according to claim 2, wherein, during the second pressing control, a highest portion of the one or more articles in the container is pressed by the pressing apparatus.

4. The article transport facility according to claim 1, wherein the contained item is one of a type 1 contained item and a type 2 contained item,
    the type 1 contained item is a contained item that is more easily broken than the type 2 contained item, and during the first pressing control,
- if the container contains no article that contains the type 1 contained item, the control apparatus causes the pressing apparatus to press, from above, the article in the container at a second set pressure, and
- if an article in the container contains the type 1 contained item, the control apparatus causes the pressing apparatus to press the article in the container at a first set pressure, which is lower than the first set pressure.

5. The article transport facility according to claim 1,
- wherein the transfer apparatus includes a holding portion for holding the upper face of the article and is also used as the pressing apparatus, and
- wherein the control apparatus performs the transfer control and the first pressing control so as to put the article held by the holding portion on a placement face of the container or on another article that has been previously transferred to the container, then lower the holding portion to press the held article from above using the holding portion, and thereafter release the hold of the holding portion holding the article.

\* \* \* \* \*